(12) United States Patent
Piersanti et al.

(10) Patent No.: US 6,829,513 B2
(45) Date of Patent: Dec. 7, 2004

(54) FIRE DETECTION SYSTEM AND METHOD FOR CONFIGURING

(75) Inventors: Frank Piersanti, Somerville, NJ (US); Tien Nguyen, Boonton, NJ (US); Reto Hug, Chatham, NJ (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 289 days.

(21) Appl. No.: 10/198,803

(22) Filed: Jul. 19, 2002

(65) Prior Publication Data

US 2003/0050713 A1 Mar. 13, 2003

Related U.S. Application Data

(60) Provisional application No. 60/306,778, filed on Jul. 20, 2001.

(51) Int. Cl.⁷ .............................................. G05B 18/00
(52) U.S. Cl. .............................. 700/83; 700/9; 700/17; 700/19; 700/276; 700/277; 700/278; 700/299; 709/220; 709/221; 709/230; 340/287; 340/577; 340/599; 340/825
(58) Field of Search ........................... 700/1, 9, 19, 18, 700/17, 83, 86, 87, 88, 89, 276, 277, 278, 299; 709/220, 221, 230; 717/121, 116, 117, 128; 340/287, 577, 599, 825

(56) References Cited

U.S. PATENT DOCUMENTS

| | | | | |
|---|---|---|---|---|
| 4,375,637 A | * | 3/1983 | Desjardins | 340/517 |
| 5,355,395 A | * | 10/1994 | Kenneth et al. | 376/216 |
| 5,394,447 A | * | 2/1995 | Scarola et al. | 376/259 |
| 5,682,487 A | | 10/1997 | Thomson | 395/342 |
| 5,715,178 A | * | 2/1998 | Scarola et al. | 702/116 |
| 5,727,175 A | | 3/1998 | Malone et al. | 395/356 |
| 5,768,552 A | | 6/1998 | Jacoby | 395/334 |
| 5,796,951 A | | 8/1998 | Hamner et al. | 395/200 |
| 5,835,091 A | | 11/1998 | Bailey et al. | 345/345 |
| 5,917,492 A | | 6/1999 | Bereiter et al. | 345/357 |
| 5,960,439 A | | 9/1999 | Hamner et al. | 707/103 |
| 5,963,207 A | | 10/1999 | Brewer et al. | 345/352 |
| 5,977,971 A | | 11/1999 | Guzak et al. | 345/340 |
| 6,054,987 A | | 4/2000 | Richardson | 345/348 |
| 6,058,103 A | | 5/2000 | Henderson et al. | 370/254 |
| 6,076,106 A | | 6/2000 | Hamner et al. | 709/223 |
| 6,151,023 A | | 11/2000 | Chari | 345/349 |
| 6,259,679 B1 | | 7/2001 | Henderson et al. | 370/254 |
| 6,278,452 B1 | | 8/2001 | Huberman et al. | 345/339 |
| 6,384,842 B1 | | 5/2002 | DeKoning et al. | 345/734 |
| 6,505,099 B1 | * | 1/2003 | Brice et al. | 700/277 |

* cited by examiner

*Primary Examiner*—Ramesh Patel

(57) ABSTRACT

The present invention provides an application which is used to program building systems such as fire safety systems. It is an object of the invention to provide a method for creating one or more configuration files for the control panel of a fire safety system to allow the control panel to more efficiently control the fire safety system. The present provides a method for creating one or more system configurations. The configuration file may be comprised of one or more user created views.

14 Claims, 17 Drawing Sheets

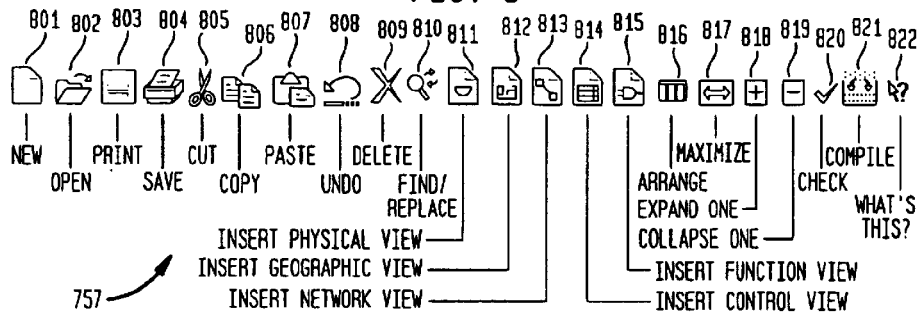
FIG. 8
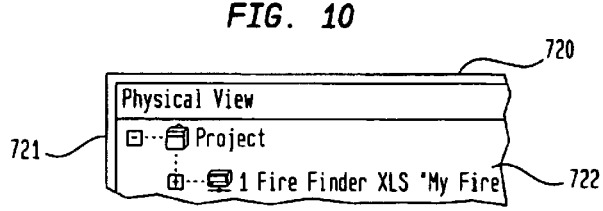
FIG. 9
FIG. 10

FIG. 16

- 1 CAB-2 "Enclosure" —726
  - CC-5 "Card Cage" —734
    - 1 DLC "Detector Loop Card" —735
      - 1 HFP-11 "FirePrint Detector" —736
      - 2 HFPT-11 "FirePrint, Thermal-Only" —737
      - 3 HTRI-S "Addr. Interface Module, Single" —738
      - 4 HTRI-M "Addr. Interface Module, Mini" —739
      - 5 HTRI-D "Addr. Interface Module, Dual" —740
      - 6 HTRI-R "Addr. Interface Module w/ Relay" —741
      - 7 HMS-S/D/M/SA "Manual Station" —742
      - 8 HMS-2S "Manual Station, 2-Stage" —743
      - 9 HZM "Conventional Zone Module" —744

FIG. 17

- 4 DLC "1st Floor Device Loop" —735
- 5 DLC "2nd Floor Device Loop" —745
  - 1 HMS-S/D/M/SA ""
  - 2 HMS-S/D/M/SA ""
  - 3 HTRI-R ""
  - 4 HTRI-R ""
  - 5 HFP-11 ""
  - 5 HFP-11 ""
  - 5 HFP-11 ""
  - 5 HFP-11 ""
  - 5 HFP-11 ""

FIG. 18

| Detail View - Detector Loop | | |
|---|---|---|
| Elements | Properties | |
| Type | Dev. Adr. | Us |
| HMS-S/D/M | 3 | Alarm |
| HMS-S/D/M | 8 | Alarm |
| HTRI-R | 9 | Alarm |
| HTRI-R | 10 | Alarm |
| HFP-11 | 1 | Alarm |
| HFP-11 | 2 | Alarm |
| HFP-11 | 4 | Alarm |
| HFP-11 | 5 | Alarm |
| HFP-11 | 6 | Alarm |
| HFP-11 | 7 | Alarm |

FIG. 19

| Detail View HTRI-R | |
|---|---|
| Elements | Properties | |
| Type | HTRI-R |
| Device Address | 9 |
| Basic Language Cust. Message | 1st Floor Air Handler Un |
| Alternate Language Cust. Message | |
| Device Usage | Output Only ▽ |
| Disarm Sensor At Startup | ☐ |
| Degrade Mode Alarm Activation | ☐ |
| LED Deactivated | ☐ |
| Use Zone Code Of Parent Group | ☐ |
| Zone Coding | ☐ |
| Zone Code Priority Level | |
| Zone Code Output Pattern | |
| Switch 1 Base Lang. Cust. Message | (Switch Not Used) |
| Switch 1 Alternate Lang. Cust. Mess | |
| Switch 1 Normally Closed | ☐ |
| Relay Base Used | ☑ |
| Relay Base Lang. Cust. Message | 1st Floor Air Handler Un |
| Relay Driven By Logic | ☑ |
| Disarm Output At Startup | ☐ |

| Detail View - OR Function | |
|---|---|
| Elements | Properties |
| Type | OR |
| Function ID | 0 |
| Function Label | ANY-ALARM DEVICES |
| Comment | AHUs/Fire Doors |

| Detail View - System Flags | |
|---|---|
| Elements | Properties |
| Type | System Flags |
| Flag Name | Any Alarm ▽ |
| Node Address | 1 |
| Negate | ☐ |

FIG. 30

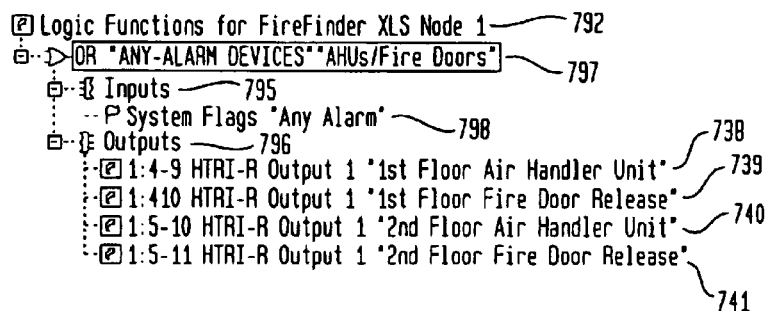

```
⊞ Logic Functions for FireFinder XLS Node 1 ———— 792
├─▷ OR "ANY-ALARM DEVICES""AHUs/Fire Doors" ——— 797
   ├─ ⊞ Inputs ——— 795
   │    └─ P System Flags "Any Alarm" ——— 798
   └─ ⊞ Outputs ——— 796                              ┌─ 738
        ├─ ⊞ 1:4-9 HTRI-R Output 1 "1st Floor Air Handler Unit" ─┘ ┌─ 739
        ├─ ⊞ 1:410 HTRI-R Output 1 "1st Floor Fire Door Release" ─┘ ┌─ 740
        ├─ ⊞ 1:5-10 HTRI-R Output 1 "2nd Floor Air Handler Unit" ─┘
        └─ ⊞ 1:5-11 HTRI-R Output 1 "2nd Floor Fire Door Release"
                                                                  ╲ 741
```

| Detail View - Function Link | |
|---|---|
| Elements | Properties |
| Type | Function |
| Flag Name | ☑ |
| Node Address | 0 |
| Negate | 1ST FLOOR ALARM TE |

FIG. 32

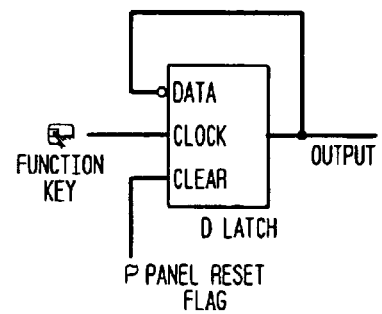

| Detail View - Logic Functions for FireFinder XLS Node | |
|---|---|
| Elements | Properties | |
| Type | Logic Functions for Fire |
| Node Address | 1 |
| Audible Control Function Priority1 | March Time 120 SPM |
| Audible Control Function Priority2 | Steady Audibles |
| Audible Control Function Priority3 | March Time 30 SPM ▽ |
| Tempo | |

FIRE DETECTION SYSTEM AND METHOD FOR CONFIGURING

CROSS-REFERENCE TO RELATED CO-PENDING APPLICATIONS

This application claims the priority to and the benefit of Provisional Application No. 60/306,778 entitled "Fire Safety System," filed Jul. 20, 2001.

The following patent applications and patents cover subject matter related to the subject matter of the present invention: "Portable Diagnostic Device" U.S. Ser. No 10/199,517; "User Interface for Fire Detection System" U.S. Ser. No. 10/199,802; "User Interface with Installment Mode" U.S. Ser. No. 10/199,801; "Fire Detection System Including an Automatic Polarity Sensing Power and Signal Interface" U.S. Pat. No. 6,738,238.

BACKGROUND OF THE INVENTION

This invention relates to an application used to plan and configure installations of fire safety systems. Prior configuration systems did not allow users to graphically design system configurations. Further, users could not assign devices to convenient, intuitive groups by location or other criteria, such as logical relationships. Using prior systems, users could not visually program system behavior.

SUMMARY OF THE INVENTION

The present invention provides an application which is used to program building systems such as fire safety systems. More particularly, it is an object of the invention to provide a method for creating one or more configuration files for control panels of fire safety systems to allow control panels to more efficiently control the fire safety system they are connected to. The present invention may be used to configure more than one fire safety systems. The user may begin by creating a physical view representing elements in a system, and may then next create a geographic view representing location groupings of elements or a functional view by assigning elements in a physical view and groups in a geographical view to logic elements. In a preferred embodiment, the user will create a geographic view before creating a functional view. The user then has the option of creating a control view and a network view. The user may then compile all the views the user has created into a configuration file, which may be comprised of physical and geographic views, as well as data related to the other views created, such as a functional view, a network view and a control view. The resulting configuration file may then be transferred into the memory of a control panel. Program logic is implemented in the memory of the control panel causing the control panel to control the fire safety system using the configuration file stored in memory.

BRIEF DESCRIPTION OF THE DRAWINGS

A better understanding of the objects, features and advantages of the invention can be gained from a consideration of the following detailed description of the preferred embodiment thereof, in conjunction with the appended figures of the drawings.

FIG. 8 is an expanded illustration of the tool bar shown in FIG. 7;

FIG. 9 is an illustration of the detail view shown in FIG. 7 showing information entered for a project;

FIG. 10 is an illustration of the physical view shown in FIG. 7 after a user has inserted and labeled a node for a project;

FIG. 16 is a partial illustration of the physical view of FIG. 13 after a user has inserted a card cage element, a device loop element and device elements;

FIG. 17 is a partial illustration of the physical view of FIG. 16 showing two device loop card elements being inserted;

FIG. 18 is an illustration of a detail view of the device elements when a user clicks on the elements tab of the detail view;

FIG. 19 is an illustration of a detail view of when a user clicks on the property key of the detail view for an element shown in FIG. 17;

FIG. 28 is an illustration of the detail view for the OR element of FIG. 27;

FIG. 29 is an illustration of the detail view of the flag element being inserted into the OR element of FIG. 27;

FIG. 30 is an illustration of the function view of FIG. 27 with inputs and outputs being inserted for the OR element.

FIG. 31 is an illustration of the detail view for a D Latch;

FIG. 32 is a logic diagram for the D Latch;

DETAILED DESCRIPTION OF THE PREFERRED EMBODIMENT

The advantages of the present invention will be described with respect to the fire safety system, apparatus and methods described below. However the invention is not limited to such embodiments, but may be applied to any building system within the scope of the attached claims.

Figure 1:
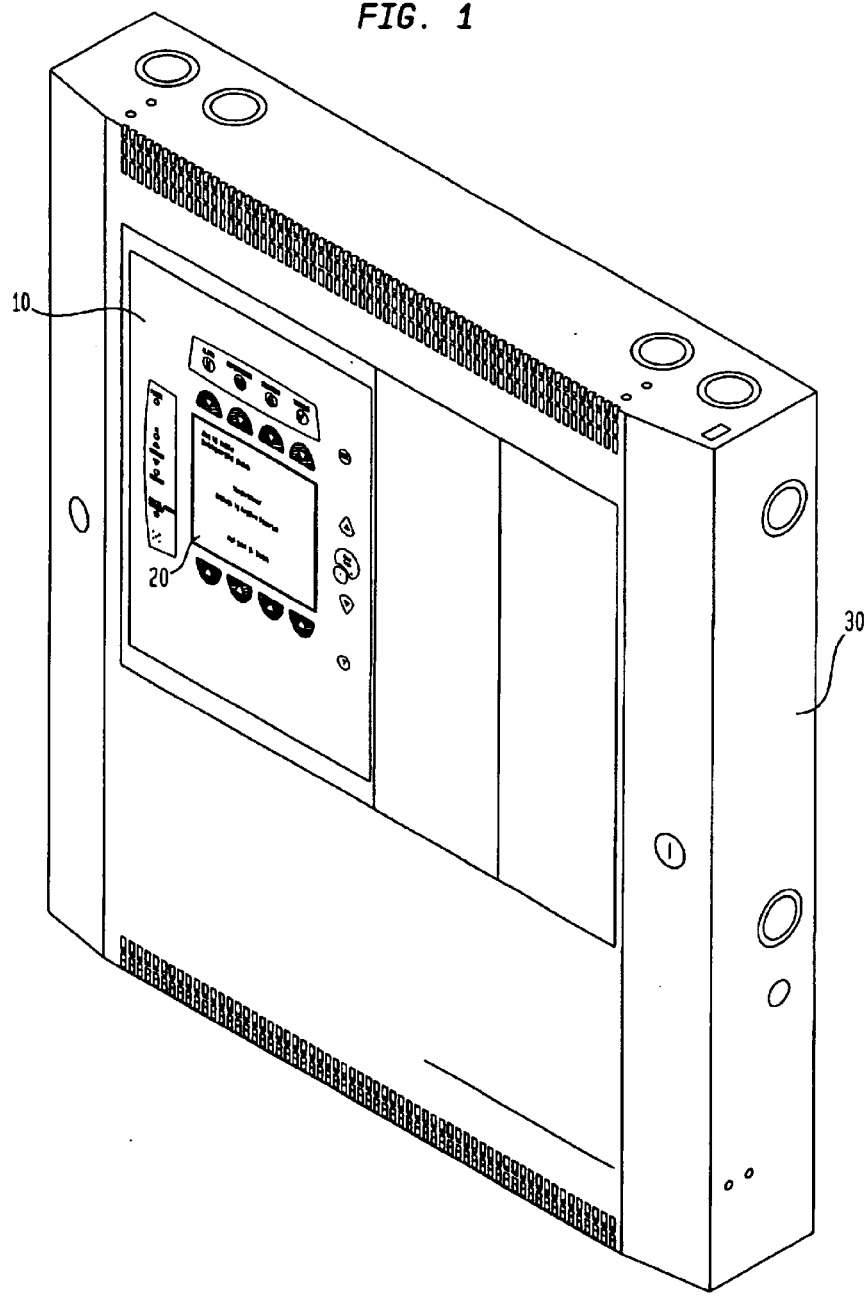
FIG. 1 is a front view of the control panel and user interface of the present invention

Referring to FIG. 1, the present invention relates to a person-to-machine user interface 10 including a display 20 mounted in a control panel 30 for monitoring and controlling a fire safety system. The control panel 30 is preferably mounted in a facility in a location that is easily accessible to members of the public, maintenance workers and emergency personnel. An operator of the interface 10 can display information about and can operatively one or more fire safety systems operably connected to the control panel 30 and can control the operation of one or more fire safety systems operably connected to the control panel 30.

Figure 2:
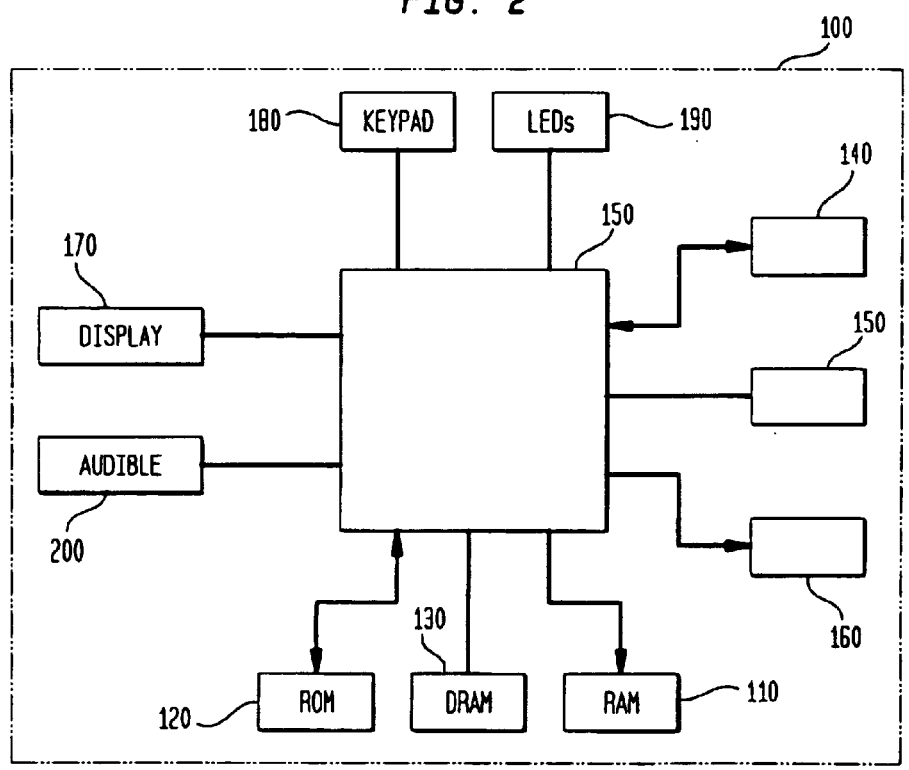
FIG. 2 is a block diagram of the user interface of the present invention

FIG. 2 is a schematic block diagram showing the general features of the user interface control architecture according to the present invention. In FIG. 2, the user interface 100 has a CPU 105, a RAM 110, a ROM 120 and a DRAM 130. The CPU 105 is preferably a Elan SC400 microcontroller from AMD. RAM 110 is preferably a non-volatile flash memory which stores the operating firmware as well as the site specific database. The CPU 105 rapidly processes logical decisions based on the status of the smoke detectors in a fire safety system operably connected to the control panel and other initiating devices to control the system outputs. The CPU 105 controls operation of the fire safety system via a bus according to stored program instructions in memory and user input from the user interface 100.

The user interface 100 comprises one or more interfaces for communicating with different levels of systems. These one or more interfaces allow the user interface 100 to communicate with user interface's 100 in other systems in a LAN, WAN, intranet or internet. Referring to FIG. 2, user interface 10 comprises interface 140 which is connected to the CPU 105 and allows the user interface 100 in one cabinet to communicate with a user interface 100 in another cabinet. User interface 100 further comprises interface 150 connected to the CPU 105 and allows the user interface 100 in one system to communicate with one or more user interfaces 100 in other systems. User interface 100 may also comprise interface 150 for allowing the user interface to be connected to a building automation system. Preferably, interface 150 is a BACNET interface. The user interface 100 further comprises a touch screen display 170, a keypad 180, LEDs 190 and audibles 200 connected to the CPU 105.

Figure 3:
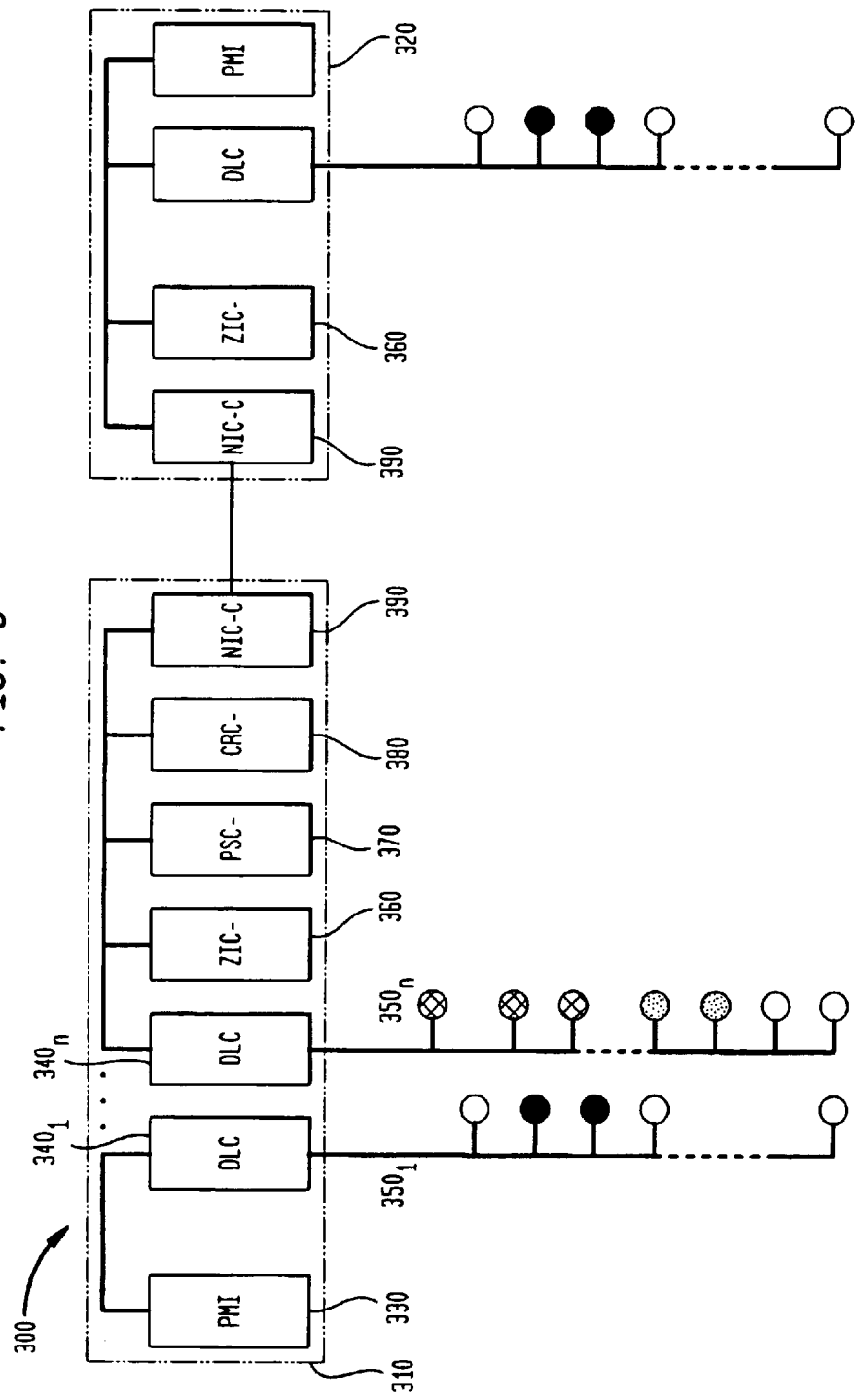
FIG. 3 is a schematic block diagram of the system of the present invention

Referring to FIG. 3, a system upon which an embodiment of the present invention can be implemented is shown as 300. System 300 is comprised of a first enclosure 310, such as a control panel cabinet, and at least other enclosure 315, such as a remote cabinet. Main cabinet 310 comprises a bus 101, or other communications hardware or software, for communicating information and signals. A person-to-machine interface user interface 330, coupled to bus 320, is used to view system information and to input control data.

System 300 further comprises one or more device loop controllers $340_1$–$350_n$ coupled to the bus 320 for controlling a loop of devices $350_1$–$350_n$. Each device loop controller 340 is the central communication point for detectors, manual pull stations and other devices such as relay bases, audible bases and remote lamps in any combination on the detector electrical loop 350. Each device loop controller 340 communicates with these device loops 350 via a protocol. Each device loop controller 340 may support up to 252 devices in one device loop 350, which consists of two independent parallel zones. Each zone may be electronically isolated should a short occur, without affecting the remaining zone. Each device loop controller 340 initializes, operates, and maintains all devices residing on the device loop 350 and communicates all relevant device and event information, such as alarms and troubles, to the interface 330. Each device loop controller 350 allows the system 300 polarity insensitive devices to be connected without generating errors. By adding further device loop controllers 340 in system 300, the system 330 can be expanded to support thousands of intelligent detectors and devices spread across a flexible number of device loops 350.

The system 300 further comprises zone indicating module 360 coupled to bus 320 which provides power to and communications with annunciation devices (alarms, strobes, etc) in the system 300. These annunciation devices can be software configured for a wide variety of functions—such as standard NAC operation (bells, horns, chimes), strobes (synchronized or non-synchronized), coded audibles (Temporal Code 3, Marchtime, Zone Coded, etc.), Municipal Tie, Leased Line, Extinguishing agent releasing (FM-200 or Halon) or sprinkler pre-action and deluge applications.

The system 300 also comprises power supply module 370 coupled to bus 320 for supplying power to the modules operably connected to bus 320. The system further includes control relay module 380 connected to bus 320. This control relay module 380 provides multiple relays with which to operate devices such as bells, horns, strobes, etc.

The system 300 further includes one or more interface modules 390 coupled to bus 320. The interface module 390 provides network communications between enclosures 310 and 315 in the system 300. The interface module 390 supervises the system 300 to insure proper operation. Any faults that are detected by the interface module 390 are reported to the interface 330 for annunciation. In addition, the interface module 390 has diagnostic LEDs (not shown) that indicate which faults have been found. Individual LEDs are included for Loop A and Loop B faults, as well as an LED for complete failure of the system 10. The interface module 390 can also be configured to perform ground fault detection in the system 300. Preferably, each interface module 390 occupies one address. One network interface module is provided for each enclosure 310,315. Further, when the present invention is implemented in a network, discussed further herein, the system 300 may be provided another network interface module, not shown, allowing the system 300 to interface with a network. The network interface module provides network communications between a particular system node with other nodes in the network.

Each module in the system 300 has its own microprocessor. To ensure reliable operation, if the interface's 330 CPU stops, these modules, operating in degrade, still annunciate any alarm or trouble through common lines called Any Alarm and Any Trouble. Preferably, all of the modules communicate with the interface's 330 CPU through an RS-485 network communications system. The microprocessor of each device loop controller 340 controls the on-board isolator to isolate either zone from the device loop 350 if one of them is shorted. When one zone is isolated from the device loop 350, the other zone will still work. The on-board microprocessor provides the device loop controller 340 with the ability to function and initiate alarm conditions even if the interface's 330 CPU fails.

Figure 4:
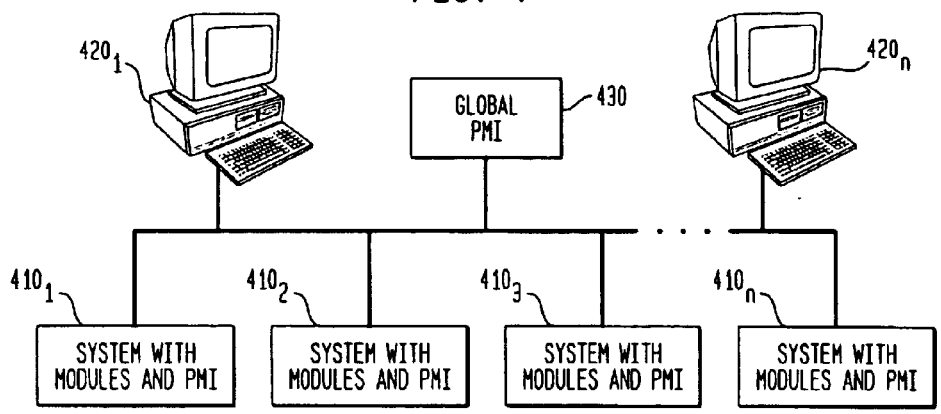
FIG. 4 is a schematic block diagram of the system of the present invention operating in a network environment.

FIG. 4 depicts a network environment 400 for one or more fire safety systems 410. According to the present invention, each fire safety system $410_1$–$410_n$ may operate in a networked environment 400 using logical connections to one or more other fire safety systems. The network environment depicted in FIG. 1 may be a LAN, a WAN, an intranet or the internet. In a preferred embodiment, the one or more fire safety systems 410 are connected through a user selected protocol.

When used in a LAN networking environment, the each system 410 is connected to the local network 400 through a network interface, such as the interface module discussed above. When used in a WAN networking environment, the interface of each system 410 typically includes a modem or other means for establishing communications over the WAN. The modem, which may be internal or external, is connected to a system bus via a serial port interface. It will be appreciated that the network connections shown are exemplary and other means of establishing a communications link between the systems 410 may be used.

The network shown in FIG. 4 comprises one or more PC-based network monitoring and control locations $420_1$–$420_n$. These PCs 420 allow an operator to see events in the network 400 and also display graphics relative to the network 400 and individual safety systems 410. Each PC 420 allows an operator to remotely control any or all of the systems, each system representing a node, and well as set configurations. It is important to note that operation of any of the PCs 420 is not essential for operation of the systems 410. The PCs 420 provide a manual point of control of the network 400 and are not part of the automatic functions of the network 400. Preferably, each of the nodes in the network operates independently. Accordingly, the network 400 depicted in FIG. 4 will still operate if the PCs 420 are not operational.

The global user interface 430 is intended to operate similarly to the network PCs 420. It is an operator display and control point but is not essential for the operation of the network 400 or any of the systems 410. The global user interface 430 will be able to be configured to display and control all or part of the system based on geographic zones. Such a configuration will generally be provided at installation time. While FIG. 4 depicts only one global user interface 430, many global user interface's may be connected to the network 400.

In a preferred embodiment, because of redundancy concerns in a life safety system, a system 410 cannot control another system's 410 outputs directly automatically. When one system 410 detects a system event, it will broadcast the event to all of the other systems 410. The other systems 410 decide if that system event will cause a change on any of their local outputs. However in an alternative embodiment, a system may be configured to control other systems' 410 outputs directly.

Figure 5:
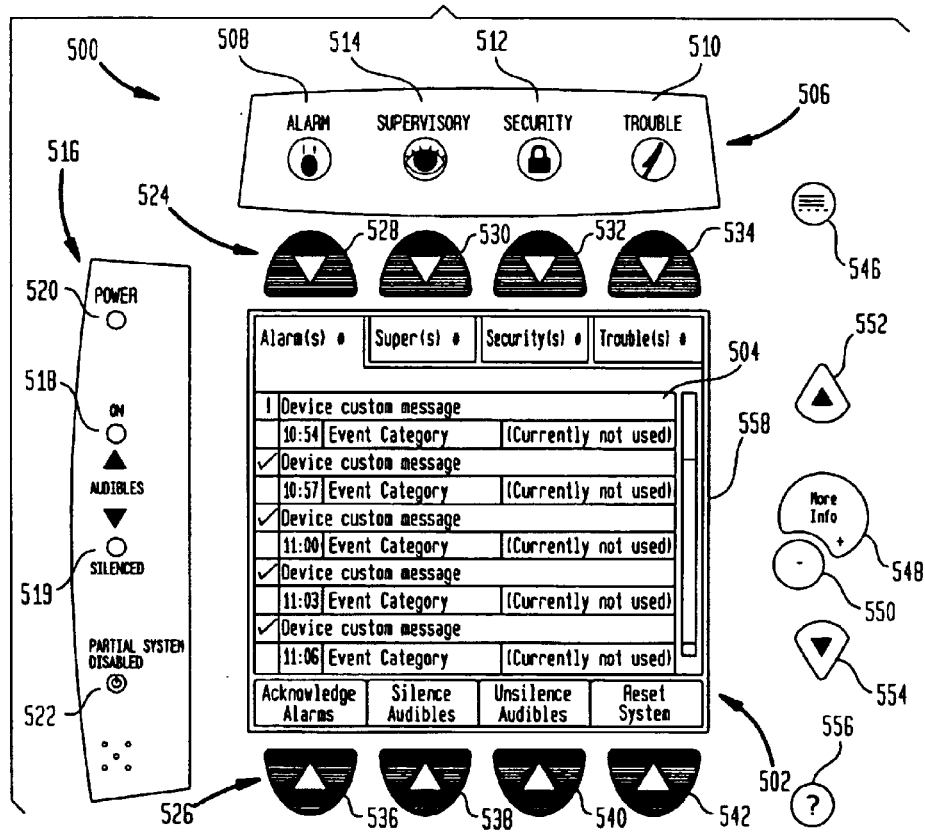
FIG. 5 illustrates a plurality of alarm events being displayed on the user interface of the present invention.

The preferred person-to-machine interface of the present invention is shown in FIG. 5. The interface 500 is the primary user interface for the fire safety system of the present invention. From the interface 500 a user can acknowledge events, control the system notification appliance circuits and reset the system. Detailed information about the nature and location of events can also be displayed.

Interface 500 is comprised of a display 502, preferably a ¼ VGA monochrome 8×8 matrix LCD touch screen 504 which provides a soft function button operator interface. The display 502 with the touch panel 504 is designed such that the touch panel 504 is attached to the entire display 502 with a backlight. With this arrangement, a user input into the user interface 500 can be performed by directly touching the surface of the touch panel 504 with a finger or a pen in accordance with an information display on the display 502. Discrete LEDs 506, comprised of ALARM LED 508, TROUBLE LED 510, SECURITY LED 512 and SUPERVISORY LED 514, are provided for displaying system status information. These LEDs 506 indicate at a glance if any events are present in the system previously described. A flashing LED indicates unacknowledged events while a steady LED shows that all the events of that type have been acknowledged by an operator. An audible sounds when there are unacknowledged events on the interface 500.

The present invention is further comprised of a second set of LEDs 516. LEDS 518 and 519 indicate the state of the audibles, where LED 518 flashes when the audibles are active and LED 519 glows steadily when the audibles are silenced. LED 520 shows that power is applied. LED 520 is on steady when the system is running from AC and flashes when on battery. The interface 500 further comprises a partial system disabled LED 522 for indicating when any module or device in the system is disabled.

Depicted in FIG. 5 keypads 524 and 526 are each comprised of a row of four keys. Keypad 524 is provided above the display 502 and keypad 526 is provided below the display 502. Keypad 524 is comprised of keys 528, 530, 532 and 534. Keypad 526 is comprised of keys 536, 538, 540 and 542. While FIG. 5 depicts the use of two rows of four keys 524 and 526, any number of keys may be used with the present invention. The use of keys 528–542 is controlled by software and backlit with a green LED which guides the operator to the next action. These rows of keys 524 and 526 have no specific function assigned to them.

The interface 500 is further comprised of keys 546, 548, 550, 552, 554 and 556 to the right of the display. Key 546 is provided to allow a user to display a menu of available information. Keys 548 and 550 allow a user to obtain more information and allow a user to navigate up or down through levels of detail about a selected event. Keys 552 and 554 allow scrolling up or down or entering in and out of event detail screens. The selected listing is highlighted in the display 502. Key 556 is provided to allow a user to obtain context sensitive help. If there are more events in the system than can be displayed on a single screen, a scroll bar 558 appears to the right of the event list.

A user may control the fire safety system with the keypads 524, 526 and the touch screen 504. The context of the touch screen 504 changes based on the system state. Events cause the display 502 to show pertinent information. The user can then review and acknowledge events. Audible devices can be silenced and the system can be reset. The user is guided to the next active key with a flashing backlite behind the key. In this way the user does not require any knowledge of the interface 500 to control the system. For more advanced users a complete menu of maintenance and diagnostics is provided. These menus may be password protected.

During normal system operation the interface's 500 green power LED 520 is on steady, the local audible is silent and the display 502 preferably contains a user selected default graphic. Pressing the menu key 546 will display the highest level of the interface's 500 menuing system. If at any time the event is received the user interface display 502 will switch to the correct context, the associated LED 508, 510, 512 or 514 will begin to flash and the local audible will sound. When the operator acknowledges the event the LED will go steady and the local audible will silence. Once all outstanding events have been acknowledged the system can be reset. If the event caused audibles to sound the audible LED 518 will flash. The interface 500 will offer a selection to silence the audibles once the event is acknowledged. The audibles LED 519 will go steady when the audibles are silenced.

Figure 6:
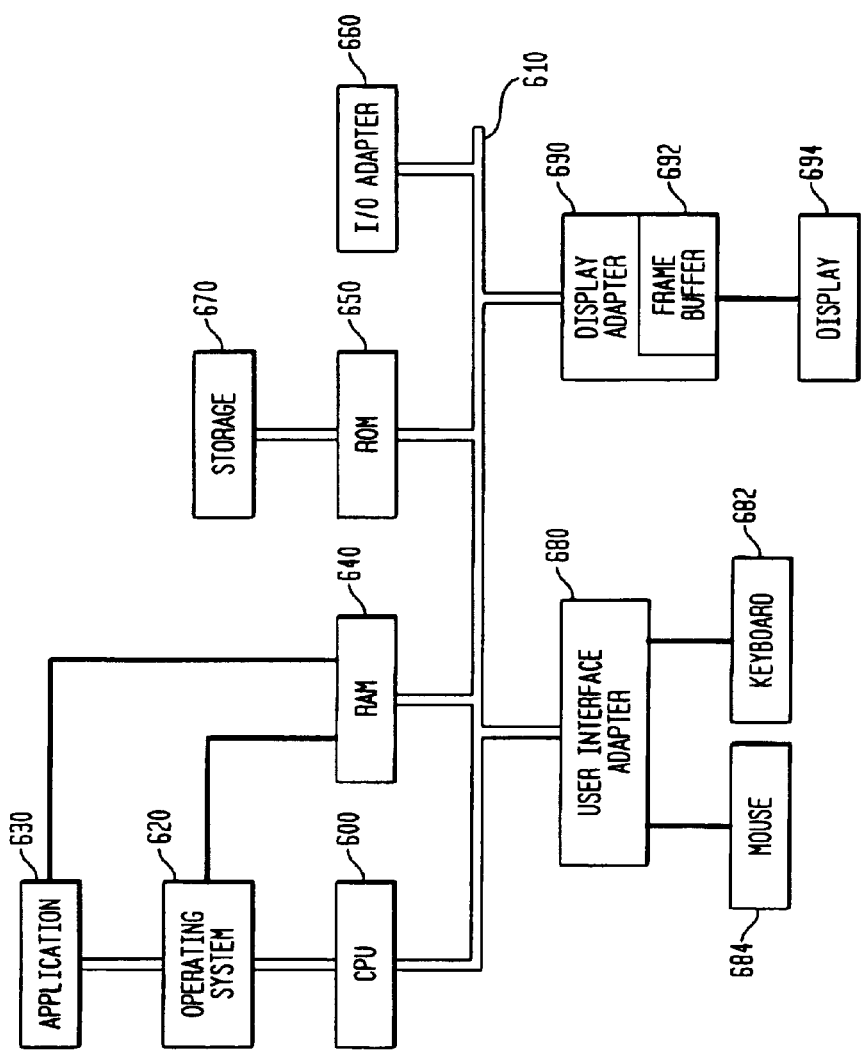
FIG. 6 is a block diagram of a data processor which is capable of implementing the program of the present invention.

Referring to FIG. 6, a typical data processing system is shown which may function as the computer controlled display terminal used in implementing the tree view and detail view functions of the present invention. A central processing unit (CPU) 600, is provided and interconnected to various other components by system bus 610. An operating system 620 runs on CPU 600, provides control and is used to coordinate the function of the various components of FIG. 6. A programming application for displaying multiple hierarchical tree views and for presenting detail views in accordance with the present invention, application 630 described subsequently herein, runs in conjunction with operating system 620.

Random access memory (RAM) 640 is connected to the bus 610. The operating system 620 and application 630 are loaded in RAM 640. ROM 650 and I/O adapter 660 are also interconnected to system bus 710. ROM 650 includes the basic input/output system (BIOS) that controls the basic computer functions. I/O adapter 660 may be a small computer system adapter that communicates with the disk storage device 670. I/O devices are also connected to system bus 610 via user interface adapter 680 and display adapter 690. Keyboard 682 and mouse 684 are interconnected to bus 610 through user interface adapter 680. It is through such input devices that the user interactive functions involved in the displays of the present invention may be implemented. Display adapter 690 includes a frame buffer 692 which is a storage device that holds a representation of each pixel on the display screen 694. Images must be stored in frame buffer 692 for display on monitor 694 through various components such as digital to analog converter (not shown) and the like. Using the I/O devices described above, a user is capable of inputting information to the system through the keyboard 682 or mouse 684 and receive output information from the system and display 694.

The present invention relates to a software application used to plan, configure and implement site installations of systems. In a preferred embodiment, the present invention is used to plan, configure and implement site installations of the fire safety system shown in FIGS. 1–5. Using the present invention, a user may graphically design a system configuration, view multiple system interrelationships such as hardware or logical connectivity, assign devices to convenient intuitive groups by location or other criteria, visually program system behavior and compile and transfer the completed configuration to a system control panel, such as the one shown in FIG. 1. The present invention allows the user to configure and examine a system's interrelationships through a series of side-by-side views that give the user information on distinct aspects of the system. The present invention implements multiple views to show different aspects of a system.

A user can build the system configuration by inserting and deleting hardware elements in the physical view. Once the user has created a physical view, the user then has the option of creating a geographic view or a function view, for example. The user can next assign hardware elements to appropriate location groupings in the geographic view or the user can set up the system behaviors by assigning devices and groups to logic elements in the function view. After the user has completed creating all desired views, the configuration can then be compiled into a configuration file that can be transferred to the system control panel.

Figure 7:
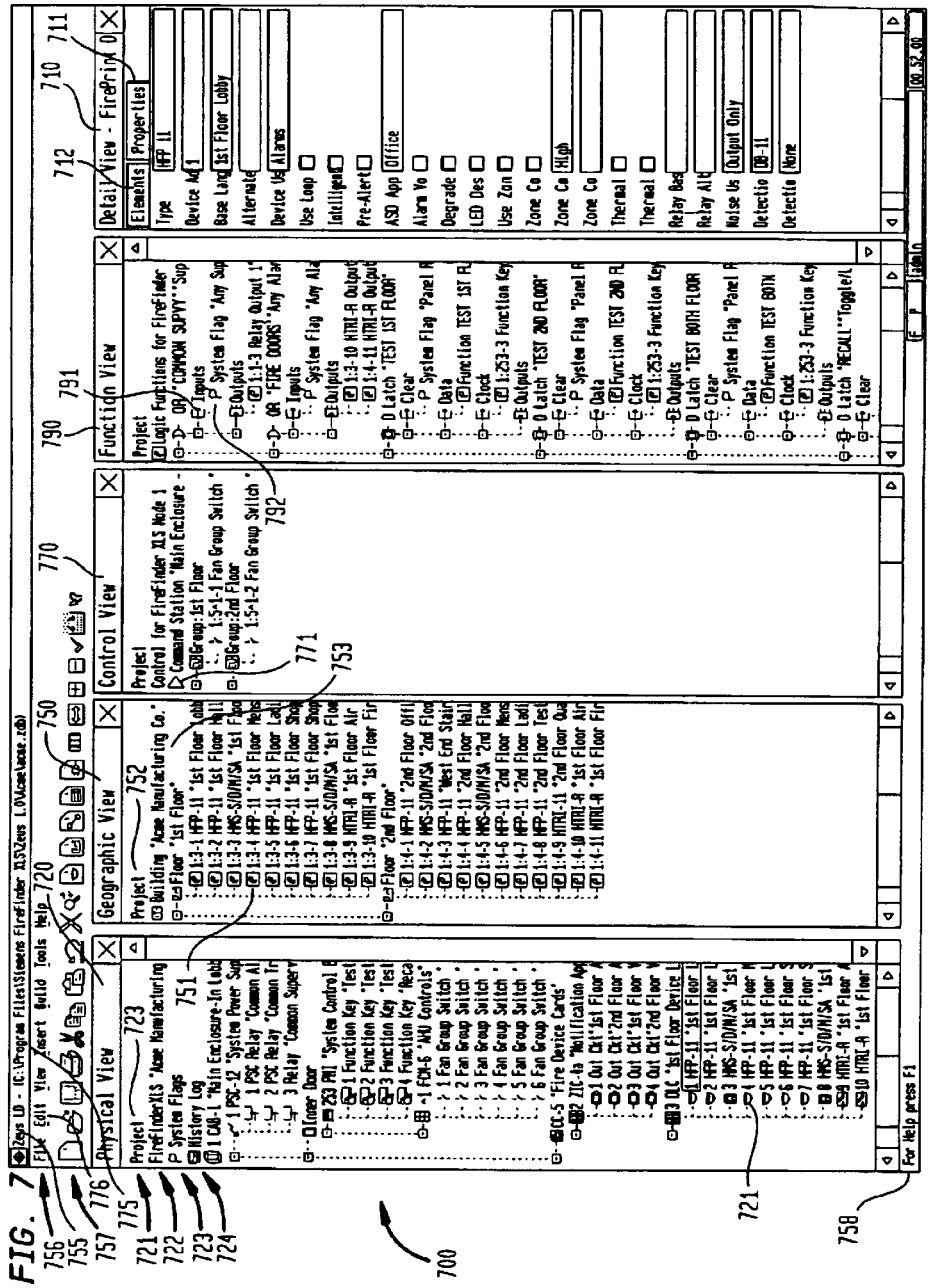
FIG. 7 is a diagrammatic illustration of a display screen showing multiple side-by-side windows showing different views of a system being configured.

The description included herein with respect to FIGS. 7–31 is for exemplary purposes only. The present invention may be used with many different types of building and automation systems. FIG. 7 shows an illustration of the present invention. The illustration 700 consists of multiple side-by-side windows showing different views of a system being configured. The detail view 710, preferably always at the right, shows the properties and child elements of a selected element in one of the tree views 720,750,770 and 790 to the left. The detail view 710 is a non-tree view that works with the currently selected ("active") view to allow the setting of component/element properties. The bars above these windows are, top to bottom: the Title Bar 755, the Menu Bar 756 and the Toolbar 757. The bar below the view windows is the Status Bar 758. FIG. 8 is a enlarged illustration of the toolbar of the present invention.

The tool bar 757 shown in FIG. 8 includes tools such as new 851, open 852, save 853, print 854, cut 855, copy 856, paste 857, undo 858, delete 859 and find/replace 860. The toolbar further includes tools particular to the present invention including an insert physical view tool 861, an insert geographic view tool 862, an insert network view tool 863, an insert control view tool 864 and an insert function view tool 865. The toolbar 757 of the present invention further includes an arrange tool 866, a maximize tool 867, an expand one tool 868 for expanding views, a collapse one view 869 for collapsing a view, a check tool 870, a compile tool 871 and a what's this tool 872 for allowing a user to make inquiries.

In tree views, elements (such as components, logic functions and geographic groups) are represented by icons and linked by dotted lines to show their place in the view's hierarchy. The hierarchical levels descend from left to right, so elements that are linked by the same vertical line are all on the same level or "tree branch". The element that a branch hangs from is called a parent element; the elements immediately dependent on it are its child elements.

The user of the present invention can begin the process of creating views by first selecting by double clicking on an icon on the users desktop identifying the present invention. Other means known in the art may also be used to open the programming tool of the present invention. The user at this point may be asked to enter a valid user name and password.

The user may then open a file menu and start a new project. The user may then be prompted then select a project name. It is important to note that the programming tool of the present invention keeps files for the same project together. For example, a folder directory C:\My Documents\Acme may be created for a project titled Acme.

To build a system, a user inserts elements in one view, and then assigns links from those elements elsewhere as needed. An element is an item represented by an icon and label in a tree view. An element may represent a hardware component, a geographic group, a logic function, etc. A link is a reference to an existing element, a "stand-in copy" of the element that is located somewhere else in the system. A link may also be considered similar to a shortcut in MS Windows or Windows Explorer. A link icon is simply a box and an arrow, with a numerical code that refers back to the original source element. Assignment is simply the process of creating a link referencing one element and associating it with another.

For example, the user of the present invention can add a fire detector by inserting a detector element into a physical view, and then assign a link from the detector to a group in a geographic view 730, assign another detector link to the input of a logic function in function view 750, and so on.

In the present invention, a user can create and assign a link simply by dragging and dropping the element from the physical view 720 to another location. Using a drag and drop function, a popup menu appears when the user releases the mouse button, giving the user the choice to cut/paste or assign as appropriate. When the user drags and drops using the left mouse button, the user will still be able to tell whether the user is about to cut/paste or assign by the cursor shown: an assignment produces a cursor object with the same box-and-arrow symbol as a link icon. A link's icon label includes a numerical code that specifies the location of the link's source element in the project.

After a user has started a new project, the programming tool screen appears, as shown in FIG. 7, with the gray detail view window 710 on the right, and at least one other view window on the left. FIG. 7 provides an example view of components in a system, and their hierarchy, with node-to-component communication protocols in parentheses. If the physical view window 720 is not displayed somewhere to the left of the detail view 710, the user may click on the insert physical view button 861 shown in FIG. 8.

The user at this point, in the physical view 720, can select the Project element 721 by single-clicking the icon so it becomes highlighted. As shown in FIGS. 7 and 9, the user may then click on the properties tab 711 at the top of the detail view 710. As shown in FIG. 9 the fields that appear are properties associated with the selected element—in this case, identifying information on the project itself. The physical view 720 displays the hardware of a building system: electrical, electronic and structural.

With the Project element 721 selected, a user may insert a node element 722 by clicking on the insert button 775. Each node element represents a single fire safety system. The Node element 722 is the "child" of its "parent" Project element 721. The user may then select a node element 722 in physical view 720, and may then click the on properties tab 711 in the detail view window 710 to insert information about the node 722 into the Detail view 710. The resulting physical view 720 is shown in FIG. 10. The user may now begin to construct the physical view 720 with respect to a system node 722.

Referring to FIGS. 7 and 10, a system node 722 represents the central point to which a central processing computer and the equipment it controls—detectors, annunciators, devices, etc—belongs. A fire system may consist of one free-standing node, such as shown in FIG. 3, or a group of nodes communicating via a communications protocol, as shown in FIG. 4.

A node may be thought to physically reside in a master PMI (control panel), because that is where the CPU is. However, a node is really a convenient organizational item, kept as a separate element in the application. Referring to FIG. 7, the system node element 722 is always accompanied by the System Flags 723 and History Log 724 elements. These are actually part of the node element 722.

The physical view 720 closely follows the physical arrangements or connections of the actual hardware of the system disclosed in FIGS. 1–5, although a few special elements represent such "intangibles" as system flag element 723 and history log element 724. Systems flag element 723 represents the system state and the history log element represents the logging of system elements.

Systems flag element 723 represents a node-wide state or condition that triggers, or is triggered by, system logic or events. Systems Flag element 723 provides an indication of a wide variety of node conditions. Examples include the presence of an alarm/trouble/supervisory event anywhere in the system, battery charge very high or low, audibles silenced—just to name a few. Each flag element 723 provides a binary output—the particular state it represents is either true/on or false/off.

The systems flag element 723 is unique in several ways: Although located in the physical view 720, the system flag element 723 is used exclusively in the function view 790. The system flags element 723 is always associated with, and located directly under the system node element 722. A physical view element is essentially a source element that allows the user to drag and drop the element into the function view 790, and assign it as a link on a function input or output, in order to add a system flag such as system flag 794. The detail view properties of the specific flag are set using the link in the function view 790, not the source element in the physical view 720.

The history log element 724 in FIG. 7 is where the user specifies which node-wide events and commands the system will record in its running electronic log file during operation. History log element 724 is actually just an extension of the system node element 722. The history log element 724 depends directly from the element 724, beneath the system flags element 723.

Figure 11:
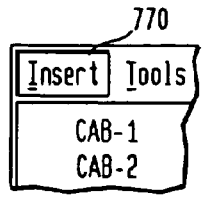
FIG. 11 is a partial illustration of the toolbar shown in FIG. 7 when a uses clicks on the insert menu to insert an element under the node.
Figure 12:
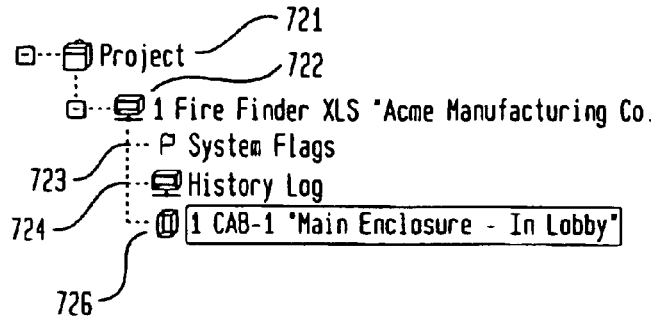
FIG. 12 is an illustration of the physical view of FIG. 10 after a system flag element, a history log element and a cabinet element have been inserted under the node element.

In the present example, Referring to FIGS. 7 and 11, the user may begin by clicking on insert 775, and insert a cabinet as a child of the node element. The user may change the label of the inserted cabinet using the detail view 710 to read for example "Main Enclosure—in Lobby." The resulting display of the physical view 720 is shown in FIG. 12, where the cabinet element 726 is shown below node element 722.

Figure 13:
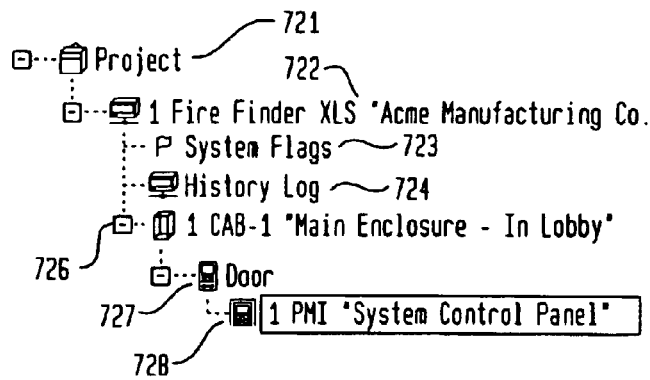
FIG. 13 is an illustration of the physical view of FIG. 12 after a user has inserted a door element under a cabinet element.
Figure 14:
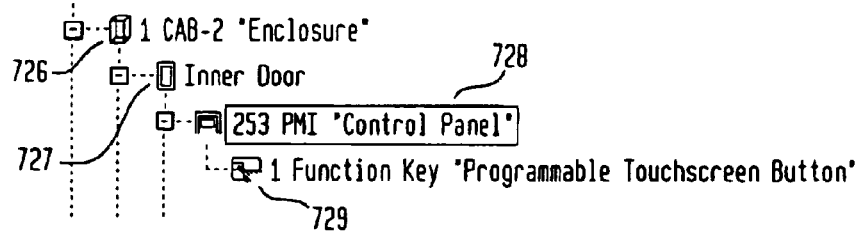
FIG. 14 is a partial illustration of the physical view of FIG. 13 after a user has inserted a PMI control panel element under a door element and a function key element under the door element.

Referring to FIG. 13, the user next can add subelements of the control panel shown in FIG. 1, such as a door element 727 by clicking on insert 775 shown in FIG. 7. By selecting the door element 727 to insert as a child element, the user then has the option of adding a Person-Machine-Interface (PMI) element 728 by clicking again on insert 775. Though not shown in FIG. 1, the PMI 10 is preferably located in the door (not shown) of the control panel 30. As shown in FIG. 14, the PMI element 728 will preferably be provided with at least one function key 729, a programmable touchscreen button, as its child.

Figure 15:
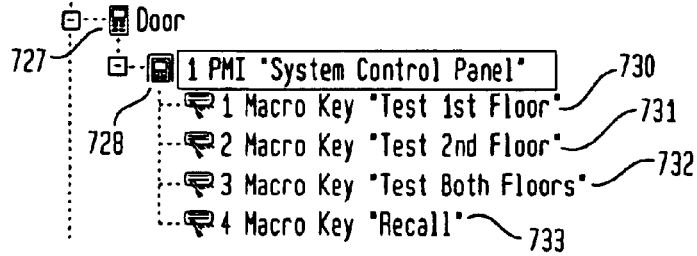
FIG. 15 is a partial illustration of the physical view of FIG. 13 after a user has inserted Function key elements under a PMI element.

Using the present invention, the user can program custom function keys into the PMI. By right-clicking on the PMI element 728, a pop-up menu appears, allowing the user to insert a Function key under the PMI element 728. As shown in FIG. 15, a plurality of Function key elements 730–733 may be inserted as children of the PMI node element 728. Using the detail view 720, the user can display a customized message next to each function key element 730–733. By clicking on the cabinet element 726, a user may add further elements as children to the cabinet such as power supply cards, card cages, and zone indication cards.

As shown in FIG. 16, the user of the present invention may next add one or more device loop cards 735 as children under a card cage element 734. Referring to FIG. 3, device loop controllers may in one embodiment be provided as cards that may be inserted into a card cage. However, the controllers for the device loops of the present invention as shown in FIG. 3 are not necessarily provided in cards, but may be provided in the control panels using other means known in the art. A device loop card may be provided for a specific geographic area such as a floor. A device loop card is the central communication point for detectors, manual pull stations and other devices on the detector electrical loop. The device loop card 735, mounted into the control panel shown in FIG. 1 using means such as plugging the card into a card cage slot (not shown), communicates with these devices via a user selected protocol. It supports up to 252 devices in one loop, which consists of two independent parallel zones. Each zone may be electronically isolated should a short occur, without affecting the remaining zone.

As shown in FIG. 16, the user may insert a plurality of different types of detector loop components 736–744 as children under each device loop card element 735 inserted by the user. As shown in FIG. 17., when more than one device loop card as added as a child element for a card cage 734, such as device loop card 736, the user may provide device loop cards 735 and 736 with a customized message using the display view to label the geographic location the device loop cards represents, such as a building floor.

A user can set device addresses of detector loop components by clicking on the device loop card 735. Using the detail view elements tab 712, shown in FIG. 18 the user can then set addresses of devices as desired. The user can reorder the elements in the Detail view 710 to make them sequential by address. The user can do this by double-clicking on the title of the "Dev. Adr." column 713 to change the order of the elements. The user can then change the physical view tree 720 to match the new detail view 710 order by clicking on edit 776 (FIG. 7) and then applying order to the tree. The device loop card's 735 child elements 736–744 then become ordered sequentially by address. Referring to FIG. 19, the user can then change the properties of the device loop elements 736–744 using the display view 710. The user may then set the key properties for all detector components such as relays (HTRIs) using their Property Tabs in the detail view 710.

Once the user has finished adding all of the elements for a node, the user may select the node 722 again, insert a History Log element 724, and examine the History Log's Properties Tab. The history log element 724 lets the user set which system events the control panel records during system operation. The user can then save this project. The user may then construct physical views for additional nodes as well.

Figure 20:
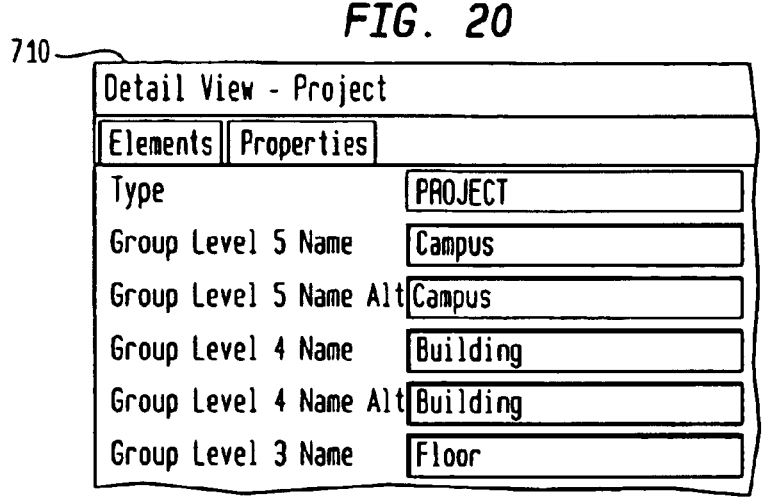
FIG. 20 is an illustration of a detail view when a user is creating a geographic view.
Figure 21:
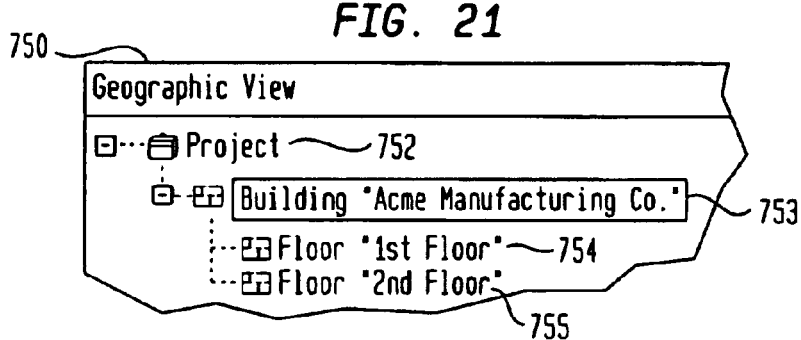
FIG. 21 is an illustration of the geographic view shown in FIG. 16 after a user has inserted a building element for a project and has inserted floor elements under the building element.

Once the user has completed constructing the physical view, the user may then create a geographic view. As shown in FIG. 7, the geographic view 750 displays a project in terms of component groups, which are normally associated to locations within the project site. As shown in FIG. 20, the geographic view's native elements consist of project site locations. The element labels—here, the default of Campus, Building, Floor, Area and Zone—may be changed by editing the data for the Project element 752 in the detail view 752. The Group Levels, to which hardware references are assigned, are fixed. In the present example, the system shown in FIGS. 1–5 is being implemented in a two-story building. However, an unlimited number of types of geographic settings may be configured using the present invention. To create a geographic view 750, the user can click on the Insert Geographic view button 862 as shown in FIGS. 7 and 8. By selecting the project element 752 of the geographic view 750, the user may insert a Building element 753 under the project element 752 of the geographic view 750. As shown in FIG. 21, the user may then insert two floor elements 754 and 755 under the building element, and using the display view, label them "$1^{st}$ Floor" and "$2^{nd}$ Floor".

Figure 22:
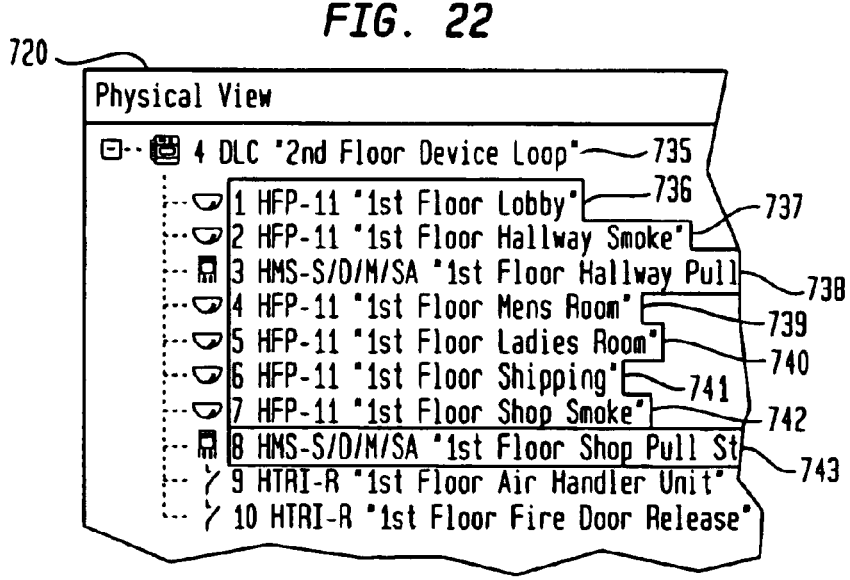
FIG. 22 is a partial illustration of the physical views when a user is in the process of selecting elements to be dragged from the physical view to the geographic view.

The user at this point can now assign devices in the physical view 720 to operating locations/groupings in the geographic view 750. For example, as shown in FIG. 22, in the physical view 720, using the left mouse button, the user can select a group of device loop components 736–743 to be dragged over to the geographic view 750, and drop it onto the $1^{st}$ Floor element 754, shown in FIG. 23.

Figure 23:
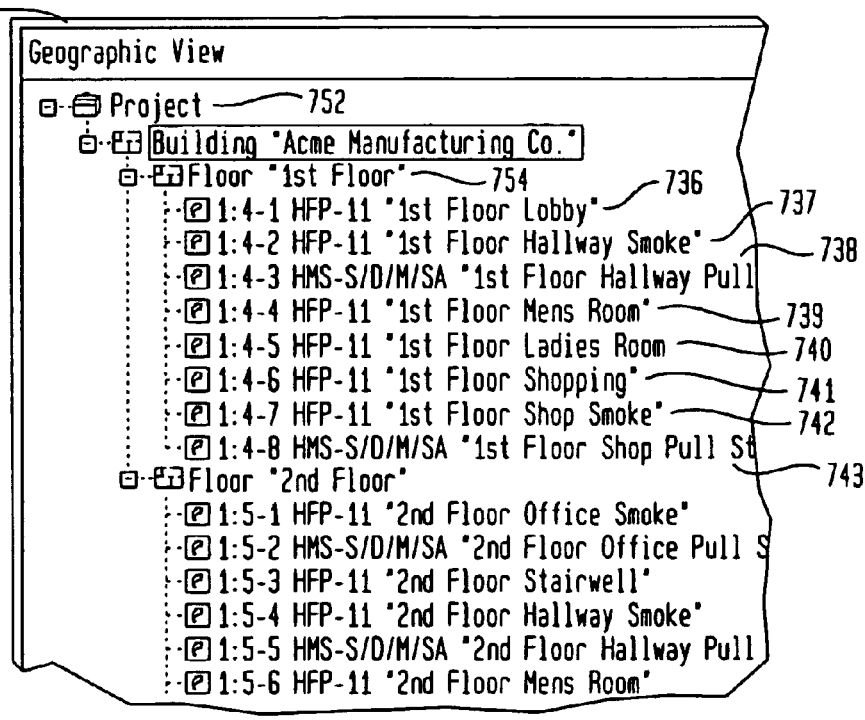
FIG. 23 is an illustration of the geographic view of FIG. 21 after a user has inserted elements from the physical view of FIG. 22.

As shown in FIG. 23, the references of the device elements 736–743 are placed under the zone; the icons are replaced by boxed arrows. The user may then repeat the process for other physical locations in the project. The user can then save the file when completed.

Figure 24:
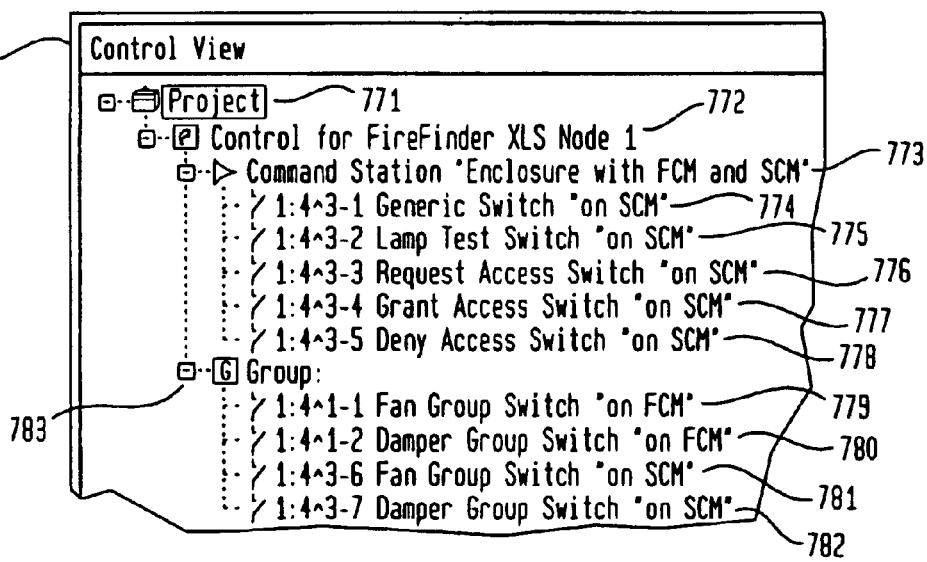
FIG. 24 is an illustration of the control view of FIG. 7.

Once the user has created a physical view 720, the user then has the option of creating a control view 770. As shown in FIGS. 7 and 24, a control view 770 enables the user to connect and manage manual and semi-automatic control paths for fan, damper and voice systems. The primary element in the control view 770 is the command station 773, also known as a voice control boundary. The command station element 773 represents the button-and-light controls that the fan control module and switch control module provide at a main or remote panel, in conjunction with a system's PMI control panels or displays.

Figure 25:
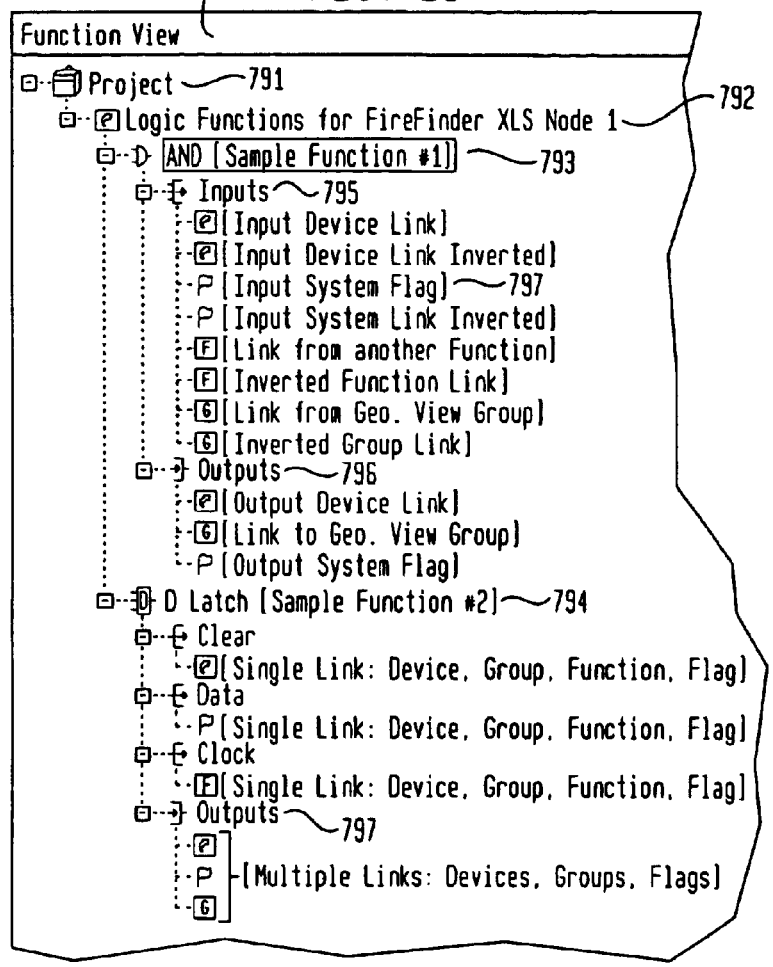
FIG. 25 is an illustration of the function view of FIG. 7 with two sample functions shown.

The control view 770 allows the user to set up the connections between command stations 773, and the rules that apply to such behaviors as request-grant-deny access, control and indication. FIG. 25 shows a command station element 773 with a variety of control switch links. The first set of links is of switch control module switches with a variety of usages, defined in the control view 770 as belonging to this command station element 773. The second set of elements 779–782 are fan and damper control switches, from both a fan control module and a switch control module. Switches of these usages must be associated with a group, which might include a variety of devices in addition to fan and damper-related items. The associations here allow activation of, say, a fan switch to control only those elements in the group that are set to fan usage.

Figure 26:
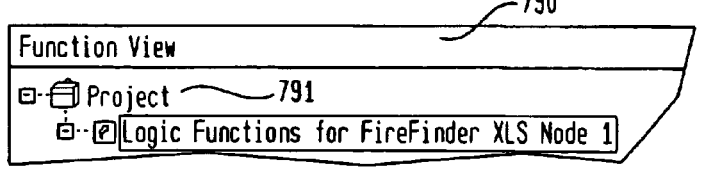
FIG. 26 is an illustration of the function view of FIG. 7 with a node element inserted.

Once a user has completed creating a physical view 720, and preferably, but not necessarily, a geographic view 750, the user may create a function view 790. As shown in FIGS. 7 and 26, the function view 790 shows the logic functions, such as the AND function 793 and the D Latch function 794, that set up the system's behaviors and connect its components. The function view 790 shows a graphical list of a system's functions, with input 797 and output 796 links to devices, groups, system flags, as well as between functions themselves. Unlike other views created using the present invention, the function view tree 790 is a list and does not directly show function-to-function connections (i.e., parent/child relationships). All functions, regardless of how they might be interconnected, are shown at the same tree level. The function view 790 is not a tree view in the strictest sense, but rather a simple list of functions under each system node. Interconnections between logic functions are not shown graphically by the view, and the view does not represent a hierarchy.

The function view's 790 native elements represent the logic functions of which the system is capable. All function elements, such as function elements 793 and 794, lie on the tree-view same level, even though they may be interconnected in very complex parent/child relationships. Referring to FIG. 26, the first function 793 allows multiple inputs at its input list 795. The second function 794 allows only single inputs at each of its input legs. (A user would need to use an OR function link to apply multiple inputs at these points.)

Both functions 793 and 794, and indeed, all function elements allow multiple output links at its output lists associated with outputs 796,797. A function can be linked only to the input of another function, not at the latter function's output. Different colors may be used to designate inputs and outputs. Inverted links (true link is input as false and vice versa) are tinged in red. Only input links can be inverted.

Generally, functions are logical operations used to develop system response to different events. A project's logic is displayed and developed in the function view 790. Functions deal with binary states (True/False, high/low), and produce desired outputs from one or more binary inputs (for example, alarm outputs from detector or manual station inputs). A user can connect the output of one or more functions to the inputs of others, to build quite complex system behaviors.

Once a function element is selected, the present invention allows the user to set its labeling by changing properties in the detail view 710. A user may use the detail view 710 to label an element or to attach a comment to the element. The detail view 710 may also be used for input properties. Most function inputs allow only a single link to be assigned to them, and are labeled for the particular input they perform, such as clear or data. The detail view 710 may also be used for input list properties. In the present invention, an input list permits multiple assignments. The way in which the function determines a true input from multiple states depends on the function or in some cases is set by a property of the function, such as start timer, restart timer or timebase control. Elements that may be linked to inputs 795 and associated input lists include a physical device such as a detector or a module, a geographic group, a system flag or another function. In the present invention, the properties input criterion and negate are generally added to the properties in the detail view 710 for each link on an input 795 or an associated input list. Another property provided in the detail view 710 for a function element is an output list associated with an output 796,797. Function output lists associated with outputs 796, 797 permit assignment of one or more link or links representing physical devices such as detectors or modules, geographic groups and system flags.

In the present invention, other functions can not be assigned to a function's output list associated with an output 796,797. One function is assigned to the next at the second function's input 795 or associated input list. As with inputs, the present invention prevents the assignment of invalid links to the function output lists for outputs 796,797. The property output selector is usually added to the properties in the Detail view 710 for each link on an output list for outputs 796,797.

To initially set up the function view 790, the user can click the function view button in FIG. 8, to open that window. If a function view has not been created, the user can click on the insert function view tool 865, shown in FIG. 8. If the physical 720 and geographic views 750 are closed, the user should preferably open them as well. To create a reference in the function view 790, the user can drag and drop a node element 725 in the physical view to the project element 791 in the Function View 790. As shown in FIG. 26, this will create a reference 792 in the Function View 790. Using the detail view 710, the user may create a customized label such as "Logic Functions for FireSystem Node". All the logic of the system, which consists of the single node, will be listed under this element 792.

Figure 27:
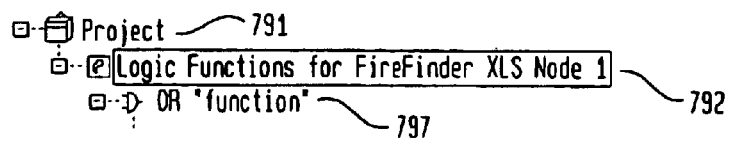
FIG. 27 is an illustration of the function view of FIG. 26 with with an OR element inserted below the node element.

As shown in FIG. 27, the "Logic Functions for FireSystem Node" element 792 is actually a link to the system node element 725 in the physical view 720. All functions within that node are listed underneath this link. The link's label is always "Logic Functions for Node n," n being the Node number as set in the physical view 720 (i.e., its address). The properties of the "Logic Functions for FireSystem Node" element have two main purposes: to set the annunciation responses driven by all audible control functions under this node, and to set up the zone code annunciation used throughout this node.

The user can then begin activating elements in the physical view 720. For example, the user can start with the activation of fire door and air handler relays under any alarm. When the user selects the insert menu at this point, the user is provided with a list of logic functions to choose from. These functions include, but are not limited to NOT, D latch, RS latch, any N, start timer, restart timer, timebase control, disarm control, audible control and LED control. The user can begin by selecting the logic functions for node element 792 shown in FIG. 27, and insert an OR function 797 from the insert Menu.

In the detail view, as shown in FIG. 28, the user can choose to make the OR function label "ANY-ALARM DEVICES" and may make the function comment "AHUs/Fire Doors". The user may then expand the OR element to show its input and output lists. In the present invention, a system flag (a node-wide electronic state) will be used to activate elements such as the fire door and air handler relays when any alarm occurs. At this point, the user may drag and drop the "generic" element system flags 723 from the physical view onto the input list 751 of the OR function. As shown in FIG. 29, in the Detail view, the user may select "Any Alarm" for the property Flag Name.

Turning to FIG. 30, the user may drag and drop device component elements such as the HTRI-Rs 738–741 from both floors in the physical view 720 to the output list 796 of the OR 797. These relays 738–741 will now activate whenever the system flag "Any Alarm" 798 occurs.

In the present invention, the system must activate a municipal tie whenever a supervisory event occurs. The built-in PSC Relays already handle the common alarm and trouble functions. The user at this point may insert a second OR under the Logic Functions for Node element, label the new OR "COMMON SUPVY" and "Municipal Tie Input", and expand the OR function to show its Input and Output Lists. The user may drag and drop the System Flags element from the physical view into the OR's Input List. In the detail view Properties Tab, the user can change the property field Flag Name to "Any Supervisory". The user may then select the Relay "Common Supervisory" on the PSC in the Physical view. The user may then drag and drop the element into the Output List of the Common Supervisory OR. Any alarm, trouble or supervisory event in the system will now activate a relay that can be used to connect the municipal tie.

Once the user has created logic functions for device components and elements, the user may create the logic for each of the programmable function keys on the control panel (PMI). While function keys are momentary, and produce an output only as long as they are pressed, it is preferable that as a user momentarily presses the key, the resulting system function will "latch" on or off. Accordingly, it is preferable to use D Latch functions to connect the function Keys to the system logic. The user may begin by inserting a D Latch under the Logic Functions for Node element 792 by clicking on the insert button and selecting the D Latch option. Using the detail view ref no., the user can label the latch with a label such as "$1^{ST}$ FLOOR ALARM TEST"/"Toggle/Latch".

This D Latch will be used as the $1^{st}$ Floor Alarm Test Function Key's toggling latch, with the output becoming and staying true with the first key press. For this role, the D Latch requires its output to be inverted (changed to the opposite state) and then fed back to its own Data Input List. To set this up, the user can drag and drop the D Latch itself onto its own Data Input List. The user can then select the newly placed function reference. As shown in FIG. 31, in the Detail view, the user can check the Negate box to invert this input.

The user may then drag and drop the $1^{st}$ Floor Alarm Test Function Key from the Physical view onto the Clock Input List. Pressing this Function Key will now cause the output to become true with the first press, then toggle between false (off) and true (on) ref. nos. with additional presses. At this point, a clear input resets the D Latch output to false (off). The user can use a Panel Reset System Flag to clear the output. This can be accomplished by drag and drop the System Flags element in the Physical view onto the Clear Input List. In the Detail view, change the property field Flag Name to "Panel Reset". FIG. 32 is a logic diagram illustrating that the $1^{st}$ Floor Alarm Test Function key toggle/latch is complete.

Figure 33:
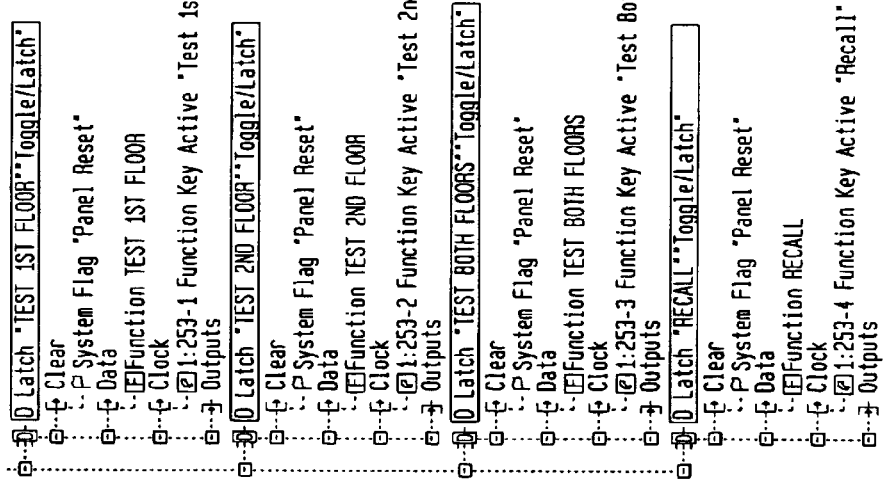
FIG. 33 is an illustration of the function view for function keys.

In the present example, the Function Keys for $2^{nd}$ Floor Alarm Test, Dual—Floor Alarm Test and Recall Signal also require D Latches for toggling. The user may insert and format these D latches as done previously; all will use Panel Reset flags for the Clear inputs, and have inverted Data inputs. The resulting view is shown in FIG. 33.

Figure 34:
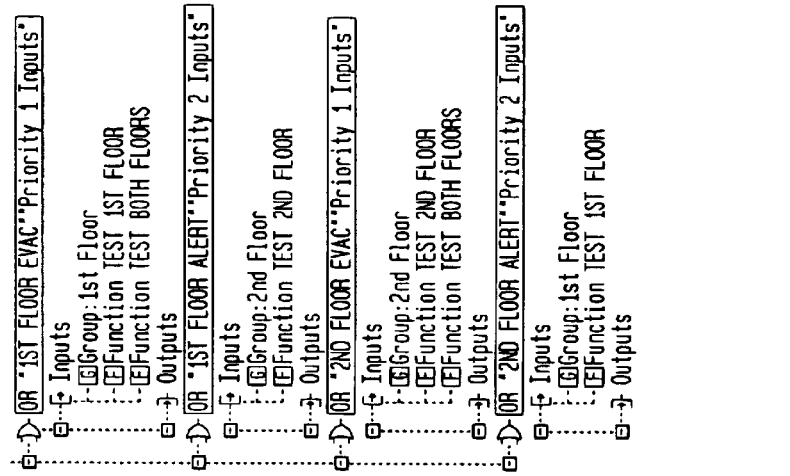
FIG. 34 is an illustration of the function view showing the logic grouping of the inputs for evacuation and alert tones for a two story facility.

The user of the present invention will also need to configure the system for audibles and visuals. In the present system, three different audible tones are required: evacuation, alert and recall. Although recall is triggered only by a single Function key, multiple conditions can activate the other tones. Referring to FIG. 34, the user of the present invention will preferably logically group the inputs for the evacuation and alert tones on two floors. For example, the user may insert four OR functions under the Logic Functions for Node element. The user may label them as follows in table 1.

TABLE 1

| Function Name | Function Comment |
| --- | --- |
| $1^{ST}$ FLOOR EVACUATION | Priority 1 Inputs |
| $1^{ST}$ FLOOR ALERT | Priority 2 Inputs |
| $2^{ND}$ FLOOR EVACUATION | Priority 1 Inputs |
| $2^{ND}$ FLOOR ALERT | Priority 2 Inputs |

Next, the user may expand the $1^{st}$ Floor Evacuation OR. From the geographic view, the user may drag and drop the $1^{st}$ Floor Group onto that OR's Input List. From the function view, the user may drag and drop the $1^{st}$ Floor and Dual Floor Alarm Test D Latches onto the same Input List.

The user may add similar inputs to the other ORs, for the following result in table 2.

TABLE 2

| Name | Inputs |
| --- | --- |
| $1^{ST}$ FLOOR EVACUATION | $1^{st}$ Floor Group |
| | $1^{st}$ Floor Alarm Test D Latch |
| | Dual-Floor Alarm Test D Latch |
| $1^{ST}$ FLOOR ALERT | $2^{nd}$ Floor Group |
| | $2^{nd}$ Floor Alarm Test D Latch |
| $2^{ND}$ FLOOR EVACUATION | $2^{nd}$ Floor Group |
| | $2^{nd}$ Floor Alarm Test D Latch |
| | Dual-Floor Alarm Test D Latch |
| $2^{ND}$ FLOOR ALERT | $1^{st}$ Floor Group |
| | $1^{st}$ Floor Alarm Test D Latch |

Figures 35, 36:
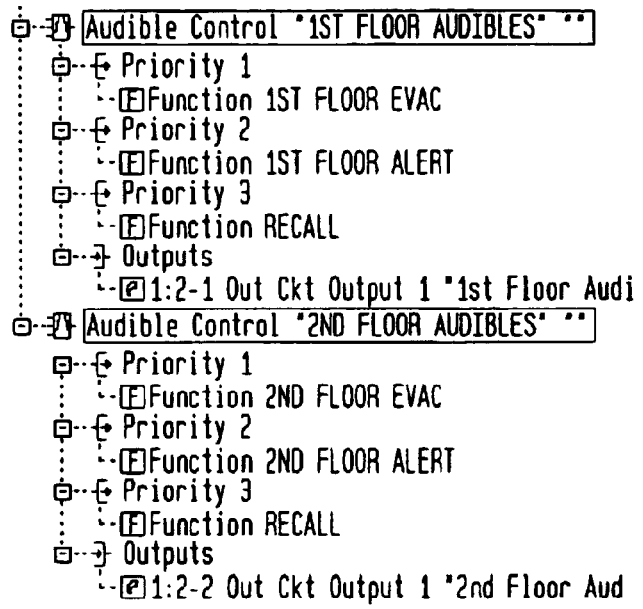
FIG. 35 is an illustration of the function view showing the logic grouping for audibles.
FIG. 36 is a detail view for the function view shown in FIG. 35.
Figure 37:
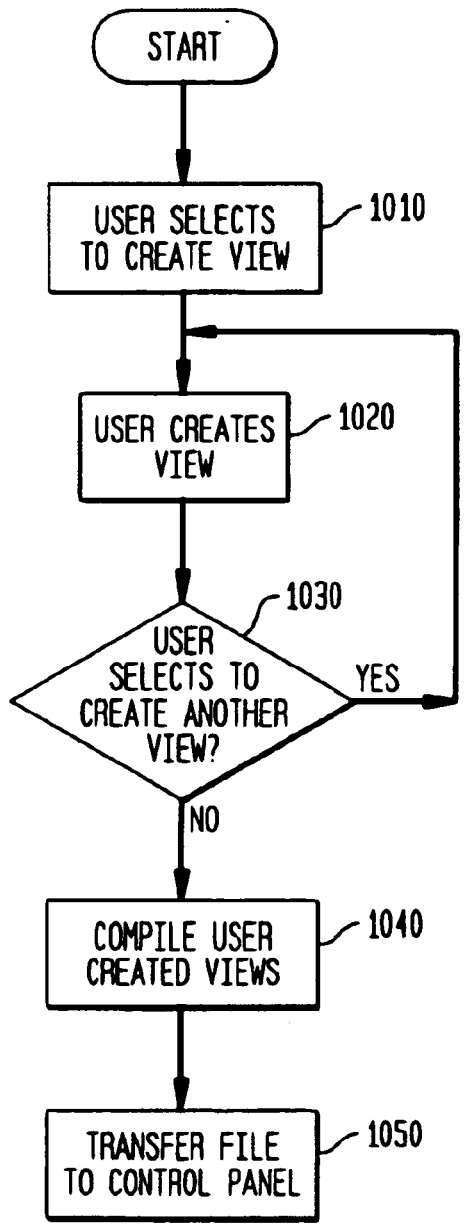
FIG. 37 is a flow diagram showing the creating of a configuration file for a fire safety system control panel.

Referring to FIG. 35, the user may now insert two Audible Control functions, fully expand them, and name them $1^{ST}$ and $2^{ND}$ FLOOR AUDIBLES. Next, the user may drag and drop the Evacuation ORs to the Priority 1 Input lists for the respective floors, may assign the Alert ORs to the Priority 2 Input Lists and may assign the Recall Signal D Latch to both Priority 3 Input Lists.

Next, from the physical view, the user may assign the ZIC Out Ckt handling $1^{st}$ Floor audibles to the $1^{st}$ Floor Audible Control Output list. The user may repeat this process for the $2^{nd}$ Floor. The user may then select the Logic Functions for the node element. As shown in FIG. 36, in the detail view, the user may set the Audible Control Function Priority Actions. The system audibles are now set up.

Since in the present invention visuals will be synchronized with the audibles, logic simply links the alarm and test events with the ZIC visual output circuits. The user at this point may insert an OR and name it "ALL VISUALS". To its Input List, the user may assign the two Floors in the Geographic view and the four Function Key latch functions—i.e., all activation sources. In the physical view, the user may confirm that the audibles ZIC circuits are "NAC-Coded" and the visuals circuits are strobe synchronized. At this point, the function view is essentially complete and the user may save the view.

The first AND Function allows multiple inputs at its "Input List." The second Function D Latch allows only single inputs at each of its input legs. A user would need to use an OR Function link to apply multiple inputs at these points. Both Functions (and indeed, all Function elements) allow multiple output links at its "Output List." A Function can be linked only to the input of another Function, not at the latter Function's output. Preferably, inputs are highlighted in different colors. Inverted links (True link is input as False and vice versa) are also preferably highlighted. Only input links can be inverted.

The user of the present invention may also create a network view. This view allows a user to view communications relationships between networks.

The PMI (control panel) of the present invention uses a compiled version of the project file. The user at this point may check the project for errors before compiling it into a configuration file to be loaded into a fire detection system. To compile this project, a user can save the program and then compile it. The compiled (.hrc) version of the system is saved to the project directory. If a fire safety system is comprised of one or more nodes, there would be multiple .hrc files, each to be transferred separately to the different nodes. The resulting configuration file is comprised of the physical view, the geographic view, and data derived from the user created control view, network view and functional view. To transfer the configuration file to a physical control panel, a user may connect a cable from the serial port of a host computer to a upload jack, not shown, of the node's control panel. The user may then run the program of the present invention and use Tools>Transfer to upload the compiled file to the control panel, with the option of saving the panel's current configuration to the host computer.

FIG. 36 is a flowchart illustrating the operation of a software application used to plan, configure and implement site installations of systems. In a preferred embodiment, the present invention is used to plan, configure and implement site installations of the fire safety system shown in FIGS. 1–5. In step 1010, referencing FIGS. 7 and 8, the user may select to create a view by double clicking on one of the view options. While a user may choose to select any view at this point, it is preferable that the user selects to create a physical view first since the physical view is used to create the other views. Preferably, the user inserts elements in the physical view, and then assigns links for these elements in other views as necessary. In step 1020, the user may then create a view once the user has selected a view to create. As discussed above, a user may create the physical view by inserting elements into the physical view. Other views are preferably created by assigning links from elements in the physical view or other views. In step 1030, the user then has the option to create another view once one or more views have been created using the tool bar shown in FIGS. 7 and 8. The user may continue creating views until all the desired views have been created. If the user has decided not to create further views, the user in step 1040 then has the option to compile the one or more views created into a configuration file. In step 1050, once the configuration file has been completed, the user then has the option to transfer the file to the control panel.

It will be appreciated by those skilled in the art that the present invention can be embodied in other specific forms without departing from the spirit or essential characteristics thereof The presently disclosed embodiments are therefore considered in all respects to be illustrative and not restricted. The scope of the invention is indicated by the appended claims rather than the foregoing description and all changes that come within the meaning and range and equivalence therof are intended to be embraced therein.

What is claimed is:

1. A method of creating one or more system configurations comprising:
   creating a physical view representing elements in a system;
   creating a geographic view representing groupings of elements by physical location; and
   creating a functional view by assigning elements in said physical view to logic elements and assigning said groupings of elements in said geographical views to logic elements.

2. The method according to claim 1, further comprising:
   compiling said views into a configuration file;
   transferring said configuration file into a memory of a control panel; said control panel using said configuration file to control elements in said system.

3. The method according to claim 1, wherein a plurality of systems are configured by creating physical views, geographic views and functional views for each system.

4. The method according to claim 1, further comprising creating a control view for connecting and managing manual and semi-automatic control paths.

5. The method according to claim 4, wherein said control view connects and manages manual and semi-automatic control paths for fan, damper, voice systems and output devices.

6. The method according to claim 1, further comprising creating a network view for controlling network communications.

7. The method according to claim 1, wherein a system flag is provided in said physical view, and is assigned as a link in said function view.

8. The method according to claim 1, wherein the step of creating a physical view for elements in a system further comprises creating a physical view for elements in a fire safety system.

9. The method according to claim 1, wherein the step of creating a geographic view representing groupings of elements by physical location further comprises creating a geographic view representing the physical location of one or more fire safety systems.

10. A fire safety system comprising:
    a control panel having a user interface with a display for controlling a fire safety system; said control panel provided with one or more controllers, each controller controlling a device loop operably connected to said control panel, each of said device loops comprised of a plurality of devices for reporting predetermined system events to said control panel,
    a memory provided in said user interface, wherein program logic is implemented in said memory capable of causing said user interface to control said devices using a configuration file stored in said memory, said configuration file comprised of at least one view and data related to at least one view.

11. The fire safety system according to claim 10, wherein said at least one view is comprised of a physical view and a geographic view.

12. The fire safety system according to claim 10, wherein said data related to at least one view is comprised of data related to a functional view.

13. The fire safety system according to claim 12, wherein said data related to at least one view further comprises data related to a control view for managing manual and semi-automatic control paths.

14. The fire safety system according to claim 13, wherein said data related to at least one views further comprises data related to a network view.

* * * * *